No. 864,187. PATENTED AUG. 27, 1907.
G. A. PARMENTER.
STREET CAR FENDER.
APPLICATION FILED DEC. 1, 1906.
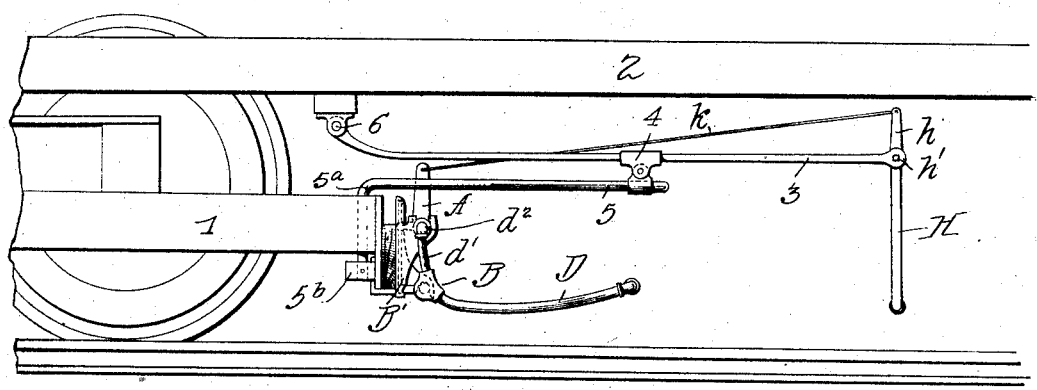
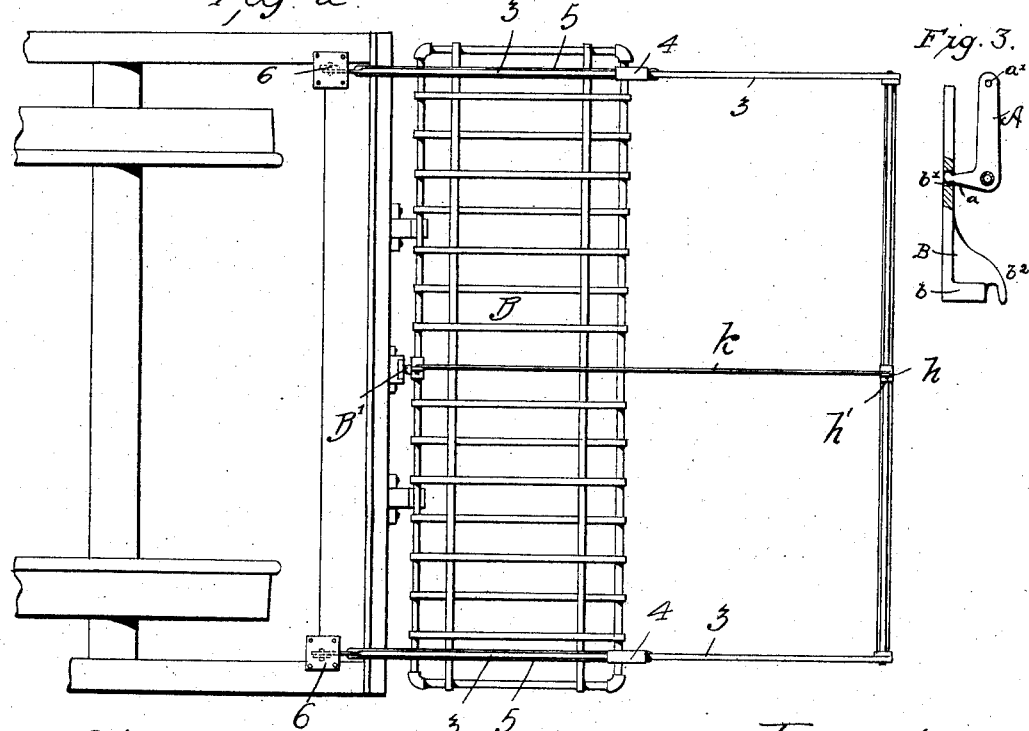

UNITED STATES PATENT OFFICE.

GEORGE A. PARMENTER, OF CAMBRIDGEPORT, MASSACHUSETTS.

STREET-CAR FENDER.

No. 864,187.  Specification of Letters Patent.  Patented Aug. 27, 1907.

Application filed December 1, 1906. Serial No. 345,933.

*To all whom it may concern:*

Be it known that I, GEORGE A. PARMENTER, a citizen of the United States, residing at Cambridgeport, Massachusetts, have invented certain new and useful Improvements in Street-Car Fenders, of which the following is a specification.

My present invention relates to car fenders of that class commonly known as trip and drop scoop, and is designed as an improvement upon the type of fender shown in Letters Patent of the United States granted to me on the 18th day of June 1901, Number 676,768.

In my said Letters Patent the fender is shown as applied to a single truck car. In cars of this nature there is a great deal of oscillation of the car body upon the truck with the result that, if the trip frame depends sufficiently near the track to make sure of its contacting with obstacles, there is danger of its being brought in contact with the rails by reason of the vertical movement of the front of the car and thus the fender accidentally is tripped. At the same time it is not feasible to support the trip solely from the car truck on account of the distance at which it must be located in advance of the fender and the sharp shocks which would be imparted by the truck frame in passing over inequalities in the track.

The object of the present invention is to provide a simple, durable, economical and efficient arrangement for supporting the trip frame at the proper distance in advance of the fender in such a manner that, notwithstanding the oscillation of the car body only a minimum amount of motion will be imparted to the trip frame which will always be maintained at substantially the same distance from the track.

With these and other objects in view the invention includes the novel features hereinafter described and particularly pointed out in the appended claims.

An embodiment of the invention is illustrated in the accompanying drawing in which.

Figure 1 is a side elevation of a portion of a car truck and frame with the fender in place. Fig. 2 is a plan view with the sills omitted and Fig. 3 is a detail view.

In this drawing B represents the scoop of the fender which is constructed in substantially the ordinary manner, having the horizontally projecting portion D and upwardly projecting portion $d'$. It is pivoted at $d^2$ and designed to be released so as to drop by gravity by the vertical movement of the locking member B which is operated by the bell crank or angle lever A in the manner described in my patent above referred to.

The truck frame is shown at 1 and the sills of the car body at 2.

The trip frame H is pivotally mounted at each side of the car upon the forward ends of side rods or bars 3 which have brackets 4 which are pivotally mounted upon the forward ends of bars 5 which project forward from the truck frame. The rear ends $5^a$ of the bars 5 are turned downwardly at substantially a right angle and are pivoted to the castings $5^b$ which project rearwardly from the front cross bar of the truck frame within the side bars. The vertical portions $5^a$ of the bars rest against the rear face of the front cross bar. The rear ends of the bars 3 are preferably curved upwardly and are pivotally connected to the car body or sills as shown at 6, where the car body has comparatively little vertical movement. The arms $h$ which project upward above the pivot $h'$ of the trip frame are connected by the rods $k$ with the angle lever A. The relation of the pivots 6 and $h'$ and bracket 4 and the relative lengths of the portion of the rods 3 between these parts is such that supposing the truck to strike a depression in the track which will cause the forward end of the car body to suddenly swing downwardly the rear ends of the bars 3 will likewise be depressed but to a less degree and, as they rock on the pivots of the brackets 4, the front ends will be raised a corresponding amount, thus raising the trip frame sufficiently to compensate for such movement.

Having thus described my invention, what I claim is:

1. The combination with a car, of a pivoted scoop carried by the truck, rocking arms projecting forward from the truck, a trip carried by the forward ends of said arms, and a connection between the rear ends of the arms and the car body, substantially as described.

2. The combination with a car, of a scoop pivotally carried by the truck frame, bars having their rear ends pivotally connected with the truck trip carrying means sustained in part by said bars and in part by the car body and tripping mechanism supported by said carrying means, substantially as described.

3. The combination with a car, of a pivoted scoop carried by the truck frame, bars projecting forward from the truck frame arms having their intermediate portions pivotally supported by said bars, a connection between the rear ends of said arms and the car body at a point where it has a moderate vertical oscillating movement, and tripping means carried at the forward ends of said arms.

4. The combination with a car, of a scoop pivotally carried by the truck, side bars having their rear ends extending downwardly in rear of the front cross bar of the truck frame an arm pivotally supported by each bar and extending forward and in rear thereof said arms having their rear ends connected to the car body, and a trip device carried by the front ends, substantially as described.

In testimony whereof, I affix my signature in presence of two witnesses.

GEORGE A. PARMENTER.

Witnesses:
 WALTER L. CAME,
 JAMES M. SPEAR.